Aug. 28, 1928.

A. L. BRIDGHAM 1,682,659

LUBRICATING DEVICE

Filed Aug. 29, 1925   2 Sheets-Sheet 1

INVENTOR=
Arthur L. Bridgham
By Coates + Hayes
ATTORNEYS=

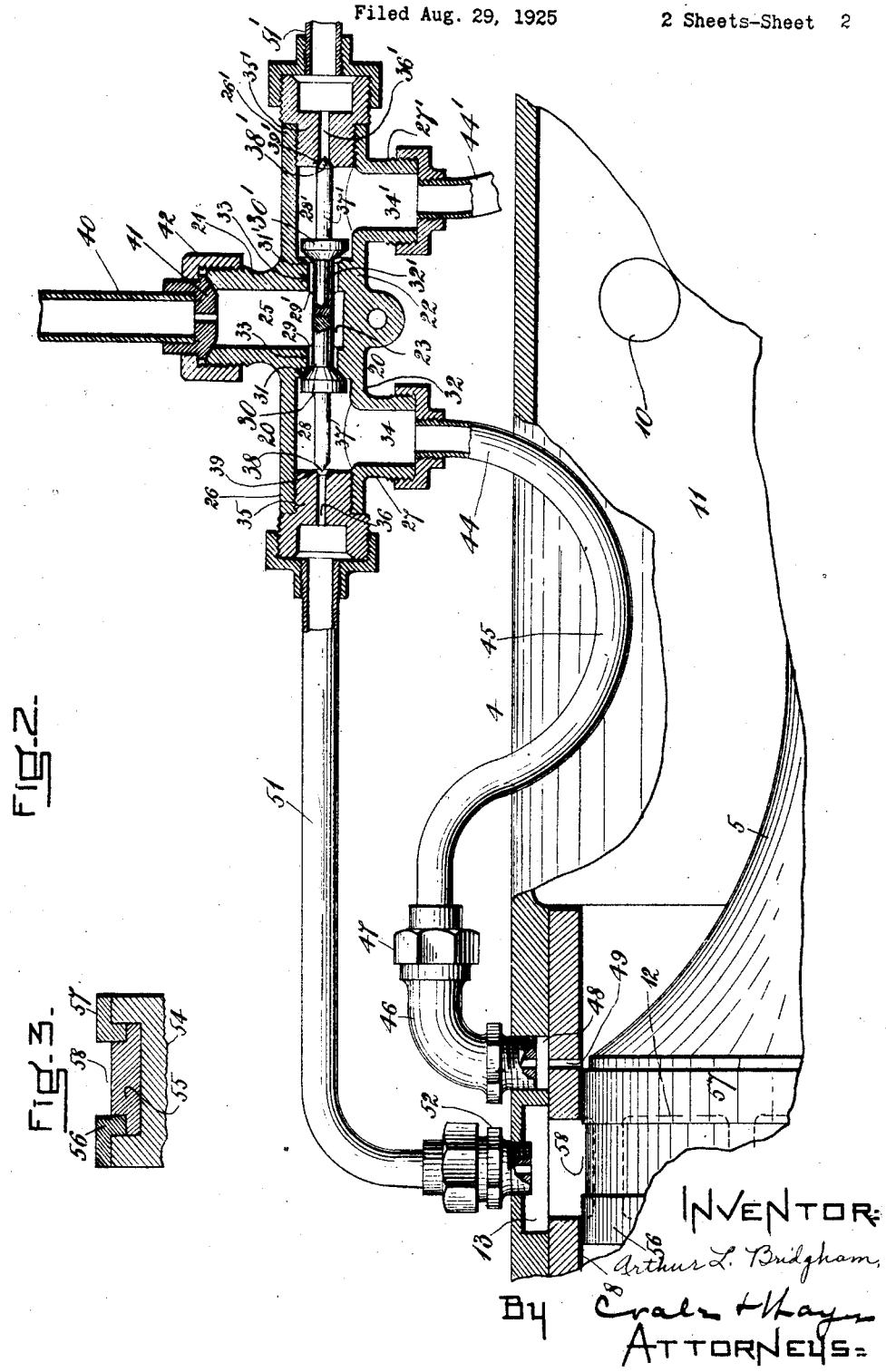

Patented Aug. 28, 1928.

1,682,659

UNITED STATES PATENT OFFICE.

ARTHUR L. BRIDGHAM, OF BOSTON, MASSACHUSETTS.

LUBRICATING DEVICE.

Application filed August 29, 1925. Serial No. 53,415.

The invention relates to a lubricating device and essentially to a device or arrangement for lubricating the joints between parts subjected to high pressure steam.

Among the essential objects of the invention are to provide a steady feed of oil; to apply the oil in such a manner that it will not be injured by the steam; to apply the oil effectively, and to use the steam as a means for atomizing the oil and applying it into the joints or places where lubrication is required.

The invention is shown in the drawings applied to the lubrication of the piston valve and piston of a locomotive to which it is especially applicable and in which only such parts are shown as are necessary to a proper understanding of the invention.

Fig. 2 shows in enlarged detail a portion of the apparatus shown in Fig. 1.

Fig. 3 is a cross section of a detail of construction to which special reference will later be made.

Figure 1:
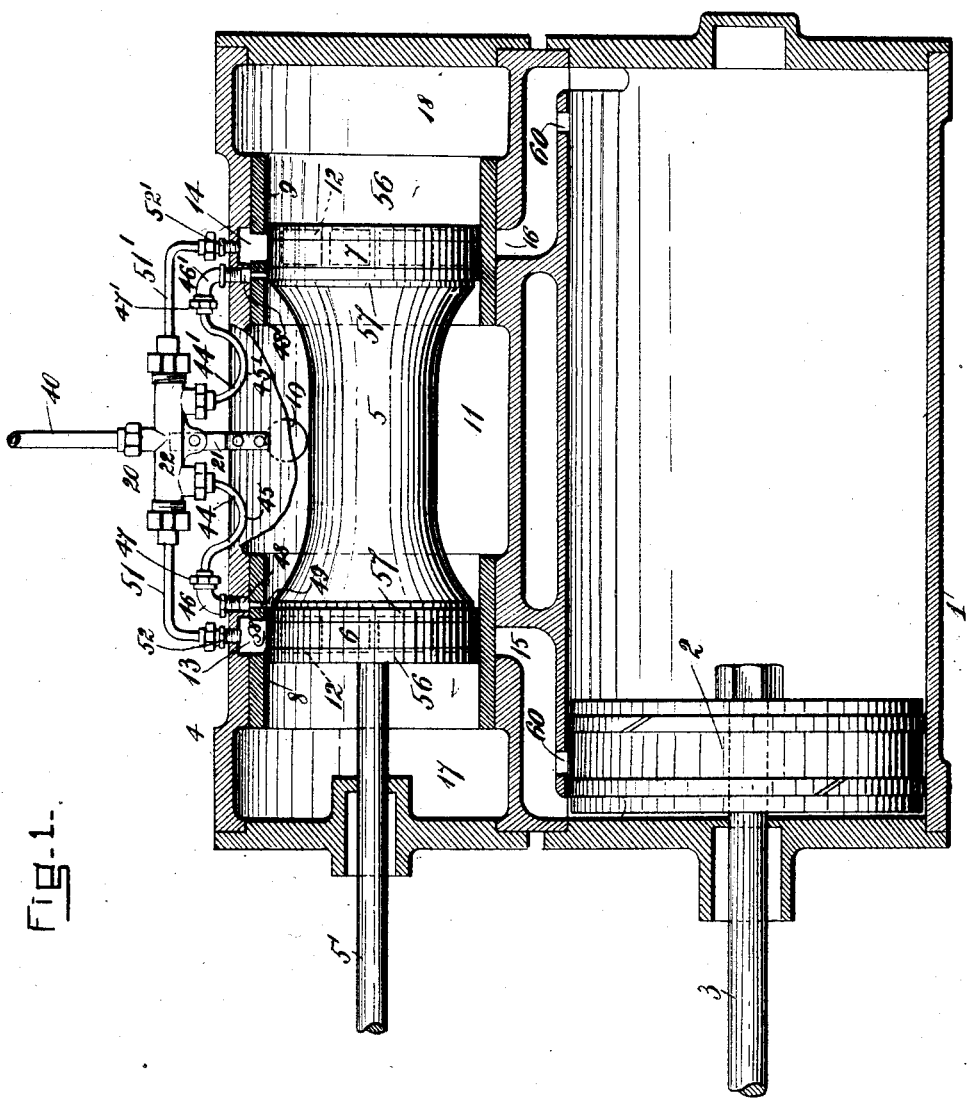
Fig. 1 is a view partly in vertical cross section and partly in side elevation of the various parts and applied lubricating device.

Referring to the drawings:

1 represents the cylinder, 2 the piston and 3 the piston rod.

4 is the casing or chest containing the piston valve 5 which controls the admission of steam to the opposite ends of the cylinder 1. 6 and 7 represent the opposite ends or heads of the piston valve which slide upon annular bearings 8 and 9, respectively, contained within the casing 4. Steam is admitted to the interior of the casing 4 by way of an inlet 10 communicating with a chamber 11 intermediate the opposite ends or heads of the piston valve. Formed within each of the annular bearings 8 and 9 are openings 12 connecting, respectively with annular passages 13 and 14 formed within the casing outside the annular bearings 8 and 9. The annular passages 13 and 14 connect, respectively, with passages 15 and 16 leading, respectively, to the opposite ends of the cylinder. At the opposite ends of the valve casing 4 beyond the heads of the piston valve are exhaust chambers 17 and 18 into one or the other of which steam is adapted to exhaust from the cylinder 1 and thence escape in the usual manner.

As the piston valve is reciprocated steam is allowed to pass through the openings 12 in one or the other of the bearings 8 or 9 and thence to the adjacent end of the cylinder for operating the piston 2. As steam is thus admitted to one end of the cylinder it is allowed to exhaust from its opposite end beyond the piston, escaping by way of the openings 12 in the adjacent bearing and thence into the adjacent exhaust chamber at the end of the casing 4.

The parts thus far mentioned are of common type and function in the usual manner. They are referred to in order to obtain a proper understanding of the invention which pertains essentially to a means for lubricating the joints between the heads or ends 6 and 7 of the piston valve and the bearings 8 and 9 on which these heads slide; also, to means for lubricating the joint between the cylinder 1 and piston 2, and to which means of lubrication attention is now directed.

20 is a valve casing arranged above the steam chest 4 and secured to the top side thereof by a supporting bracket 21. 22 represents the body of the casing and 23 the chamber thereof. Connecting with the body 22 of the casing is an inlet portion 24 through which extends an inlet passage 25 leading direct to the chamber 23 of the casing. Connecting also with the body of the casing and extending laterally therefrom in opposite directions are outlet portions 26 and 26¹ respectively, and from these outlet portions there depend auxiliary outlet portions 27, 27¹, respectively. The outlet portions 26 and 26¹ of the casing form within them passages 28, 28¹, respectively. These passages lie exterior the chamber 23 of the casing and connect therewith respectively by means of ports 29, 29¹. These ports are controlled by inwardly closing valves 30, 30¹ which close against valve seats 31, 31¹ at the outlets of the respective ports controlled by the valve. The valves 30 and 30¹ are provided respectively with stems 32 and 32¹ which extend inwardly from the valves through the respective ports and each of the stems is provided with wings 33 which engage the adjacent surrounding wall of the port by which the stems of the valves may slide thereon and the valves assume an open or closed position with relation to their respective valve seats and the parts controlled by the valves. The two valves 30 and 30¹ are not connected valves. The relation of their inwardly extending stems is such however that the stems abut or meet within the chamber 23 of the valve casing and thereby prevent both valves being seated at the same time, but the relation is such that both valves may be open at the same time.

Connecting with the respective passages 28 and $28^1$ are outlet passages 34, $34^1$ which extend respectively through the depending branch connections 27, $27^1$. Fitting within the ends of the respective outlet portions 26, $26^1$ beyond the respective passages 28, $28^1$ therein are hollow plugs 35, $35^1$. Extending through these plugs are constricted passages 36, $36^1$ which extend respectively from the respective passages 28, $28^1$. Secured to the respective valves 30 and $30^1$ are stems 37, $37^1$. These stems pass through the respective passages 28, $28^1$ and the ends 38, $38^1$ of the respective stems are made conical to have valvular engagement with valve seats 39, $39^1$ formed at the entrance to the respective constricted passages 36 and $36^1$. The lengths of these stems are such that when the valve 30 is closed the valvular end 38 of its stem 37 will occupy an open position with relation to the seat 39 and when the valve 30 is open the valvular end 38 of its stem 37 will occupy a closed position with relation to the seat 39. In similar manner when the valve $30^1$ is closed the valvular end $38^1$ of its stem $37^1$ will occupy an open position with relation to the seat $39^1$ and when this valve is closed the valvular end $38^1$ of its stem $37^1$ will occupy an open position with relation to the seat $39^1$.

40 is a pipe leading from a lubricator not shown. This pipe provided with a fitting 41 having a constricted opening $41^1$ in it, connects with the inlet portion 24 of the valve casing 20 and is secured to it by a coupling 42.

Connected by couplings 43 with the outlet portions 27, $27^1$ of the valve casing 20 are pipes 44, $44^1$. Both of these pipes curve downwardly over the side of the casing 4 forming bends or bows 45 within them, both pipes thence extending upwardly and outwardly over the casing 4 and are provided with elbow extensions 46, $46^1$ secured by couplings 47. The elbows 46, $46^1$ connect respectively with openings 48, $48^1$ through the top wall of the steam chest and communicate with ports 49, $49^1$ in the respective annular bearings 8 and 9. These ports lie respectively adjacent to the inner edges to the ends 6 and 7 of the valve 5 when this valve is occupying a central or normal position within the chest 4 so that one or the other of the ports will be opened by a slight movement of the valve in one direction or the other and when open have direct access to the chamber 11 of the casing 4 into which steam is admitted through the opening 10 as previously explained. The ends of the elbows 46 and $46^1$ which connect with the steam chest and openings 48, $48^1$ therein are preferably provided with small constricted openings therethrough in size substantially comparing with the size of the ports 49, $49^1$.

Connected by pipe couplings 50 with the hollow plugs 35, $35^1$ in the ends of the outlet portions 26, $26^1$ of the casing 4 are pipes 51, $51^1$. These pipes extend outwardly in reverse directions over the top of the casing 4, and thence turn downwardly to connect with the respective openings 13 and 14 in the wall of the casing by means of fittings 52 and $52^1$ secured to the ends of the respective pipes by couplings 53. The fittings 52, $52^1$ which are connected to the top wall of the casing and open into the respective openings 13 are preferably provided with constricted openings therethrough.

The respective heads 6 and 7 of the piston valve 5 each comprises an end supporting bearing 54 (see Fig. 3) surrounding which are the usual bull ring 55 and packing rings 56 and 57, of which 56 are the outer exhaust packing rings and 57 the inner pressure packing rings. When each valve head is in place engaging its bearing owing to the slight projection of the packing rings beyond the outer face of the bull ring an annular chamber 58 will be formed between the packing rings and between the bull ring. The annular chamber 58 thus provided, extending as it does entirely around the head of the valve, makes an effective depository for oil applied to the joint between the head of the valve and its adjacent bearing for lubricating the joint and all adjacent working parts.

The operation is as follows:

It will be assumed that oil is entering from the lubricator through the pipe 40 under the usual lubricator pressure. Now assuming that the valve 5 has moved during its reciprocation to the right in the direction of the arrow thereon, in such case the head 7 of the valve will have moved over to a point where the port $49^1$ is left exposed and high pressure steam from the chamber 11 will accordingly enter this port and pass upwardly through the pipe $44^1$ back through the passages $34^1$ and $28^1$ to the valve $30^1$ closing this valve and opening the valve 30, for simultaneous with the opening of the port $49^1$ the head 6 of the valve will have moved over so far as to lap by the port 49 closing this port from the steam chamber 11 and accordingly, pressure from this chamber being cut off, the valve 30 may be opened as the valve $30^1$ is closed. The valve 30 now being opened oil will pass from the lubricator out of the chamber 23 of the valve casing, through the port 29 and through the passages 28 and 34 into the pipe 44, the flow of oil continuing until the reverse movement of the piston valve has moved it to the left in a direction reverse to the arrow thereon until the port 49 is opened and the port $49^1$ closed. The instant the port 49 is opened high pressure steam from the chamber 11 will pass out through the port 49, back through the pipe 44 and blow the oil which has accumulated therein out through this pipe, back through the passages 24 and 28, closing the valve 30 and opening the valve 38 when the oil will be blown out through the pipe 51 into the annular opening 13 and thence through the openings 12 in the annular bearing 8 directly into the joint between the head 6 of the valve and the wall of the bearing, the oil, in other words, then entering the annular chamber 58 in the joint between the head 6 of the valve and its bearing thereby lubricating said head and bearing. The oil will also be directed to pass through the annular passage 13 downwardly into the passage 15 into the cylinder 1 for lubricating the piston, all surplus oil remaining in the passage 13 being blown into the cylinder when the head 6 of the valve has moved so far to the left as to enable the steam from the chamber 11 to enter the passage 13 and be directed into the cylinder for operating the piston.

During the time when the oil is being blown onto the head 6 of the valve 5 the valve 30 then being closed, the closure of this valve will have opened the valve $30^1$ and closed the valve $39^1$ when oil from the lubricator will pass outwardly through the port $29^1$ and through the passages $28^1$ and $34^1$ into the pipe $44^1$. Upon the return of the piston valve 5, the port $49^1$ being then opened and the port 49 closed, the pressure will operate to blow the oil that has accumulated in the pipe $44^1$ back through this pipe through the passages $34^1$, $28^1$, closing the valve 30 and opening the valve 39 when the oil will be blown out through the pipe $51^1$ into the annular opening 14 and thence through the openings 12 in the annular bearing ring 9 for lubricating the head 7 of the valve and its adjacent bearing precisely in the same manner as the head 6 of the valve and its adjacent bearing was lubricated, the lubrication also of the adjacent end of the cylinder and piston being effected by the entry of oil through the passage 16. In other words, the operation is continued in such manner that as one part or section of the mechanism is lubricated by the injection into such mechanism of a pocketed charge of oil by high pressure steam, another charge of oil is being pocketed to be injected by the high pressure steam into another part or section of the mechanism for lubricating it, the operation being repeated.

When drifting or when the throttle is closed and no steam is passing to the chamber 11 of the steam chest, both valves 30 and $31^1$ will be opened and both valves 38 and $38^1$ closed by the pressure of oil from the lubricator and oil will be fed through both pipes 44 and $44^1$.

In connection with the operation of the device it will be understood that the pressure of the steam from the chamber 11 is much higher than the pressure under which the oil is entering from the lubricator. The oil will never be exposed to extreme high temperature as the steam coming in contact with the oil will always be expanded and giving up its heat while carrying the oil. The operation also is such that the oil is being blown from high pressure to low pressure thereby tending to atomize the oil and distribute it as a fine spray or mist, all of which is advantageous in the present connection.

What I claim as my invention is:

1. In combination, a reciprocating member, a bearing therefor, and means for lubricating the joint between said member and bearing when the reciprocating member is occupying a determinate position with relation to the bearing to form said joint, said means comprising a chamber which contains fluid under pressure, an oil supply, communications, one with an outlet into said joint and the other controlled by the reciprocating member to have intermittent open communication with said pressure chamber and closure therefrom as said member is reciprocated, and means whereby oil from the oil supply will be supplied to and pocketed within said other of the communications when it is closed from the pressure chamber during one phase of the reciprocation of said member and whereby also oil thus pocketed within said other of the communications will be ejected therefrom by the fluid pressure within the pressure chamber through said one of the communications first mentioned into said joint for lubricating the joint when said member is occupying its determinate position as aforesaid to form said joint and is permitting also open communication between said other of the communications and the pressure chamber.

2. In combination, a reciprocating member, a bearing therefor, and means for lubricating the joint between said member and bearing when the reciprocating member is occupying a determinate position with relation to the bearing to form said joint, said means comprising a chamber which contains fluid under pressure, an oil supply, communications, one with an outlet into said joint and the other controlled by the reciprocating member to have intermittent open communication with said pressure chamber and closure therefrom as said member is reciprocated, means controlled by the pressure in said pressure chamber permitting of the feed of oil into said other of the communications to become pocketed therein when said other of the communications is closed from the pressure chamber and permitting also of the ejection of oil therefrom by the fluid pressure with the pressure chamber through said one of the communications first mentioned into said joint for lubricating the joint when the reciprocating member is occupying its determinate position as aforesaid to form said joint and is permitting also open communication between said other of the communications and the pressure chamber.

3. In combination, a reciprocating member, a bearing therefor, and means for lubricating the joint between said member and bearing when the reciprocating member is occupying a determinate position with relation to the bearing to form said joint, said means comprising a chamber which contains fluid under pressure, an oil supply, communications, one with an outlet into said joint and the other controlled by the reciprocating member to have intermittent open communication with said pressure chamber and closure therefrom as said member is reciprocated, means whereby oil from the oil supply will be supplied to and pocketed within said other of the communications when it is closed from the pressure chamber during one phase of the reciprocation of said member and whereby also oil thus pocketed within said other of the communications will be ejected therefrom by the fluid pressure within the pressure chamber through said one of the communications first mentioned into said joint for lubricating the joint when said member is occupying its determinate position as aforesaid to form said joint and is permitting also open communication between said other of the communications and the pressure chamber, and means whereby said one of the communications first mentioned will be closed from said other of the communications during the pocketing of oil within said other of the communications as aforesaid.

4. In combination, a reciprocating member, a bearing therefor, and means for lubricating the joint between said member and bearing when the reciprocating member is occupying a determinate position with relation to the bearing to form said joint, said means comprising a chamber which contains fluid under pressure, an oil supply, communications, one with an outlet into said joint and the other controlled by the reciprocating member to have intermittent open communication with said pressure chamber and closure therefrom as said member is reciprocated, means controlled by the pressure in said pressure chamber permitting of the feed of oil into said other of the communications to become pocketed therein when said other of the communications is closed from the pressure chamber and permitting also of the ejection of oil therefrom by the fluid pressure within the pressure chamber through said one of the communications first mentioned into said joint for lubricating the joint when the reciprocating member is occupying its determinate position as aforesaid to form said joint and is permitting also open communication between said other of the communications and the pressure chamber, and means controlled by the fluid pressure within the pressure chamber whereby said one of the communications first mentioned will be closed from said other of the communications during the pocketing of oil within said other of the communications as aforesaid.

5. In combination with a piston valve having separate spaced heads, a casing in which the valve is reciprocable, said casing having on the interior thereof separate spaced bearings for said heads of the valve and between said heads a chamber in which steam is received under pressure, of means for lubricating the respective heads of the valve and their respective bearings comprising an oil feed, primary and secondary branch communications therefrom, said primary communications having outlet respectively into the joints between said heads of the piston valve and their respective bearings, said secondary branch communications extending respectively to have intermittent open communication with said pressure chamber with closure therefrom when said valve is occupying different determinate positions during its reciprocation, and means for controlling the passage of oil from said feed whereby oil will be admitted to and pocketed within one of said secondary communications when said communication is closed from the pressure chamber, and at the same time oil admitted to and pocketed in the other of said secondary communications then open to the pressure chamber will be ejected therefrom by pressure of fluid in said chamber and through the adjacent primary communication into the joint into which said communication has outlet.

6. In combination with a piston valve having separate spaced heads, a casing in which the valve is reciprocable, said casing having on the interior thereof separate spaced bearings for said heads of the valve and between said heads a chamber in which steam is received under pressure, of means for lubricating the respective heads of the valve and their respective bearings comprising an oil feed, primary and secondary branch communications therefrom, said primary communications having outlet respectively into the joints between said heads of the piston valve and their respective bearings, said secondary branch communications extending respectively to have intermittent open communication with said pressure chamber and closure therefrom when said valve is occupying different determinate positions during its reciprocation, means for controlling the passage of oil from said feed whereby oil will be admitted to and pocketed within one of said secondary communications when said connection is closed from the pressure chamber, and at the same time oil admitted to and pocketed in the other of said secondary communications then open to the pressure chamber will be ejected therefrom by pressure of fluid in said chamber and through the adjacent primary communication into the joint into which said communication has outlet, and means for preventing the passage of oil directly from the feed into said primary communications.

7. In combination with a piston valve having separate spaced heads, a casing in which the valve is reciprocable, said casing having on the interior thereof separate spaced bearings for said heads of the valve and between said heads a chamber in which steam is received under pressure, of means for lubricating the respective heads of the valve and their respective bearings comprising an oil feed, primary and secondary branch communications therefrom, said primary communications having outlet respectively into the joints between said heads of the piston valve and their respective bearings, said secondary branch communications extending respectively to have intermittent open communication with said pressure chamber and closure therefrom when said valve is occupying different determinate positions during its reciprocation, a two-way valvular mechanism for controlling the passage of oil to said secondary branch communications functioning whereby the passage of oil from the feed will be cut off from the one of said secondary communications open to the pressure chamber, and will pass into the other of said secondary communications closed from the pressure chamber.

8. In combination with a piston valve having separate spaced heads, a casing in which the valve is reciprocable, said casing having on the interior thereof separate spaced bearings for said heads of the valve and between said heads a chamber in which steam is received under pressure, of means for lubricating the respective heads of the valve and their respective bearings comprising an oil feed, primary and secondary branch communications therefrom, said primary communications having outlet respectively into the joints between said heads of the piston valve and their respective bearings, said secondary branch communications extending respectively to have intermittent open communication with said pressure chamber and closure therefrom when said valve is occupying different determinate positions during its reciprocation, a valvular mechanism for controlling the passage of oil to said secondary communications comprising a valve casing and separate inwardly closing valves with stems meeting inside said casing.

9. In combination with a piston valve having separate spaced heads, a casing in which the valve is reciprocable, said casing having on the interior thereof separate spaced bearings for said heads of the valve and between said heads a chamber in which steam is received under pressure, of means for lubricating the respective heads of the valve and their respective bearings comprising an oil feed, primary and secondary branch communications therefrom, said primary communications having outlet respectively into the joints between said heads of the piston valve and their respective bearings, said secondary branch communications extending respectively to have intermittent open communication with said pressure chamber and closure therefrom when said valve is occupying different determinate positions during its reciprocation, a valvular mechanism for controlling the passage of oil to said secondary communications comprising a valve casing and separate inwardly closing valves with stems meeting inside said casing, and other stems carried by said respective valves for controlling the passages through said respective primary communications.

10. In combination, a cylinder and piston, a piston valve with a casing in which the valve is reciprocable, said valve having separate spaced heads and the casing of the valve forming within it a pressure chamber between the heads of the valve with passages controlled by said heads leading respectively from the pressure chamber to the opposite ends of the cylinder, bearings for the heads of the piston valve and with which bearings said heads co-operate to form joints with annular passages adjacent thereto communicating respectively with said passages leading to the opposite ends of the cylinder when the heads of the piston valve are positioned for admitting pressure thereto from the pressure chamber, and means for lubricating said joints between the piston heads and their respective bearings and for lubricating also said cylinder and piston comprising an oil supply, primary and secondary branch communications therefrom, said primary communications having outlets respectively into said joints and annular passages adjacent thereto, said secondary branch communications extending respectively to have intermittent open communication with said pressure chamber with closure therefrom when said valve is occupying different determinate positions during its reciprocation, and means for controlling the passage of oil from said feed whereby oil will be admitted to and pocketed within one of said secondary communications when said communication is closed from the pressure chamber and at the same time oil admitted to and pocketed within the other of said secondary communications then open to the pressure chamber will be ejected therefrom by pressure of fluid in said chamber and through the adjacent primary connection into the joint into which said communication has outlet and annular passage adjacent thereto then communicating with the adjacent end of the cylinder.

11. In combination, a cylinder and piston, a piston valve with a casing in which the valve is reciprocable, said valve having separate spaced heads and the casing of the valve forming within it a pressure chamber between the heads of the valve with passages controlled by said heads leading respectively from the pressure chamber to the opposite ends of the cylinder, bearings for the heads of the piston valve and with which bearings said heads co-operate to form joints with annular passages adjacent thereto communicating respectively with said passages leading to the opposite ends of the cylinder when the heads of the piston valve are positioned for admitting pressure thereto from the pressure chamber, and means for lubricating said joints between the piston heads and their respective bearings and for lubricating also said cylinder and piston comprising an oil supply, primary and secondary branch communications therefrom, said primary communications having outlets respectively into said joints and annular passages adjacent thereto, said secondary branch communications extending respectively to have intermittent open communication with said pressure chamber with closure therefrom when said valve is occupying different determinate positions during its reciprocation, and means for controlling the passage of oil from said feed whereby oil will be admitted to and pocketed within one of said secondary communications when said communication is closed from the pressure chamber and at the same time oil admitted to and pocketed within the other of said secondary communications then open to the pressure chamber will be ejected therefrom by pressure of fluid in said chamber and through the adjacent primary connection into the joint into which said communication has outlet and annular passage adjacent thereto then communicating with the adjacent end of the cylinder, and means for preventing the passage of oil directly from the oil supply into said primary communications.

ARTHUR L. BRIDGHAM.